US011969741B1

(12) United States Patent
Faherty

(10) Patent No.: US 11,969,741 B1
(45) Date of Patent: Apr. 30, 2024

(54) DEVICE FOR DISPENSING LIQUIDS TO A SHOWER HEAD

(71) Applicant: Patrick Faherty, Anchorage, AK (US)

(72) Inventor: Patrick Faherty, Anchorage, AK (US)

( * ) Notice: Subject to any disclaimer, the term of this patent is extended or adjusted under 35 U.S.C. 154(b) by 120 days.

(21) Appl. No.: 17/077,288

(22) Filed: Oct. 22, 2020

(51) Int. Cl.
*E03C 1/04* (2006.01)
*B05B 1/18* (2006.01)
*E03C 1/046* (2006.01)

(52) U.S. Cl.
CPC .............. *B05B 1/185* (2013.01); *E03C 1/046* (2013.01)

(58) Field of Classification Search
CPC ................................ B05B 1/185; E03C 1/046
USPC .................................................. 239/314, 318
See application file for complete search history.

(56) References Cited

U.S. PATENT DOCUMENTS 2,609,232 A * 9/1952 Taulman .................. A47K 5/12 239/305
3,083,915 A * 4/1963 Grauel .................. B05B 7/2443 239/460
3,091,402 A 5/1963 Palmer
3,198,437 A 8/1965 Faglie
3,285,521 A 11/1966 Coakley
3,486,695 A 12/1969 Novak
3,764,074 A 10/1973 James
3,907,203 A * 9/1975 Skillings ............... E03C 1/0465 239/524
4,027,822 A 6/1977 Usher
4,131,232 A * 12/1978 Pollinzi ................. E03C 1/0465 239/419
4,189,100 A 2/1980 Kar
4,200,206 A 4/1980 Chase et al.
4,218,013 A 8/1980 Davison
4,840,311 A 6/1989 Shamblin
5,071,070 A 12/1991 Hardy
D326,896 S 6/1992 McNeely
5,135,173 A 8/1992 Cho
5,247,858 A * 9/1993 Niiyama ................. F16H 59/68 192/48.601
5,562,248 A * 10/1996 Khalifka ............... B05B 1/3033 222/145.5
10,232,391 B2 * 3/2019 Timmerman ............. B05B 1/18
2006/0101575 A1 * 5/2006 Louis ....................... E03C 1/046 4/676
2009/0045268 A1 * 2/2009 Selander ............... B05B 12/126 239/310

* cited by examiner

*Primary Examiner* — Qingzhang Zhou
(74) *Attorney, Agent, or Firm* — Michael Tavella

(57) ABSTRACT

A device for dispensing liquids to a shower head that has a container and valve assembly that are inverted and secured to a wall surface above the shower head with a bracket. The outlet of the valve has a semi-flexible hose that extends down and out from the valve. A diffuser cap is positioned over the shower head. The hose is placed through an opening in the diffuser cap. When the valve is opened, a slow drip of liquid is dispensed through the hose directly into the water stream in the diffuser cap. What is dispensed from the diffuser is a soapy mixture that can be directly applied to a user's body. When done, the valve is closed and the diffuser cap is easily rinsed. In this way, the efficient delivery of soap to showers can be done cheaply and easily without the cost or need for replacement shower heads.

8 Claims, 6 Drawing Sheets

DEVICE FOR DISPENSING LIQUIDS TO A SHOWER HEAD

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to dispensers for soaps and other liquids and particularly to dispensers for soaps and other liquids for use in a shower.

2. Description of the Prior Art

Showering has become the predominant form of bathing in this country. While many soap products have been introduced for homes, institutions face problems of having many people use shower facilities. For example, prisons, schools, health clubs and shelters all have institutional showers. People using them need soap during the shower. While many people carry soap, it is not always the preferred way for soap to be brought to the shower. For example, having the users in prisons and schools carry soap to and from the showers is difficult and possibly messy.

To avoid such problems, soap dispensers are typically provided. These units are wall mounted and can be filled with liquid soap as needed. Of course, it still requires the user to be able to operate the soap dispensers. This can be difficult for disabled people, for example.

To solve this problem, several designs for soap dispensers that are integral with the shower head have been developed. Examples of such devices are found in the following U.S. Pat. No. D326,896, teaches a custom designed shower head with a bottom mounted moisturizer dispenser. U.S. Pat. No. 3,091,402 teaches a custom shower head with 4 attachment point for bottles containing liquids for dispensing. U.S. Pat. No. 3,198,437 teaches a standard shower head onto which a clamp is secured. This clamp holds a dispensing bottle that is inverted. A tube exits the bottle and is angled in the direction of the shower spray. U.S. Pat. No. 3,285,521 teaches a shower head that has a dispenser mounted below the water stream. A tube runs from the dispenser, into the main water pipe and down into the shower head The fluid is then discharged from the shower head without mixing in the water flow. U.S. Pat. No. 3,486,695 teaches a dispenser that attaches to a custom shower head. The dispenser has space for at least two liquids. Mixing valves and a timer are provided. U.S. Pat. No. 3,764,074 teaches a custom shower head with a dispenser mounted below. U.S. Pat. No. 4,027,822 teaches a dispenser that is attached to the shower water line. A portion of the flowing water is drawn into the device where it mixes with fluid from the dispenser, after which, it reenters the main waterline and is dispensed through the shower head. U.S. Pat. No. 4,189,100 teaches another custom shower head with a fluid dispenser. U.S. Pat. No. 4,200,206 teaches a device that is attached to the shower waterline ahead of the shower head. The dispenser has a mechanism for mixing and dispensing fluid into the waterline. U.S. Pat. No. 4,218,013 teaches a custom shower head with a a large dispenser suspended below the shower line. The dispenser holds multiple fluids and has a control to dispense fluids into the shower head. U.S. Pat. No. 4,840,311 teaches as yet another custom shower head that has dispensers mounted above and below the water feed line. These units feed liquid into the waterline to be dispensed through the shower head. U.S. Pat. No. 5,071,070 teaches a custom waterline for placement between the main waterline and a shower head. This unit has a dispensing bottle with a valve. Finally, U.S. Pat. No. 5,135,173 teaches another custom shower head that has two dispensers attached. A mixing unit with a control that feeds the fluids into the shower head is also provided.

All of the above patents teach devices that have some type of container that holds liquids. All of the containers are connected to a shower head through a plumbing connection that puts the liquid directly into the shower head delivery pipe. Thus, these are internal mix devices in that the liquid is mixed with the shower water while the water is in the pipe leading to the shower head.

Moreover, while all of the above patents describe system for dispensing soaps, the vast majority of them require complete replacement of the shower head to be used. This increases the cost of the shower heads and makes large-scale replacement expensive. Moreover, with the exception of U.S. Pat. No. 3,198,437, all of them mix the fluids in the waterline that feeds the shower head. This requires that the piping be changed to accommodate the dispenser and the additional piping. In the case of U.S. Pat. No. 3,198,437, although this design is simple, it is too simple. Here, the device is a pipe that drips fluid into the shower stream with little or no mixing, while it does deliver the fluid, it is not the most effective way to deliver soap, for example, to a user.

BRIEF DESCRIPTION OF THE INVENTION

The instant invention overcomes all these problems. It is a device for dispensing liquids to a shower head that has a container and valve assembly that are inverted and secured to a wall surface above the shower head with a bracket. The outlet of the valve assembly has a semi-flexible hose that extends down and out from the valve. The hose can be bent to align the end of the hose with the shower stream exiting the shower head. The semi-flexible nature of the hose ensures that it will maintain its position above the stream. A diffuser cap is positioned over the shower head. The hose is placed through an opening in the diffuser cap. When the valve is opened, a slow drip of liquid is dispensed through the hose directly into the water stream in the diffuser cap. What is dispensed from the diffuser cap is a soapy mixture that can be directly applied to the user's body. To rinse the cap, the user shuts off the valve and allows the shower to run until the diffuser cap is clean. When the soap container is empty, it is removed from the bracket, the valve assembly is removed, and a new bottle is installed. In this way, the efficient delivery of soap to showers can be done cheaply and easily without the cost or need for replacement shower heads.

The valve can be a manually controlled type or, it can be a motorized valve that is operated by a button or switch easily accessible to the user.

DETAILED DESCRIPTION OF THE INVENTION

Figure 1:
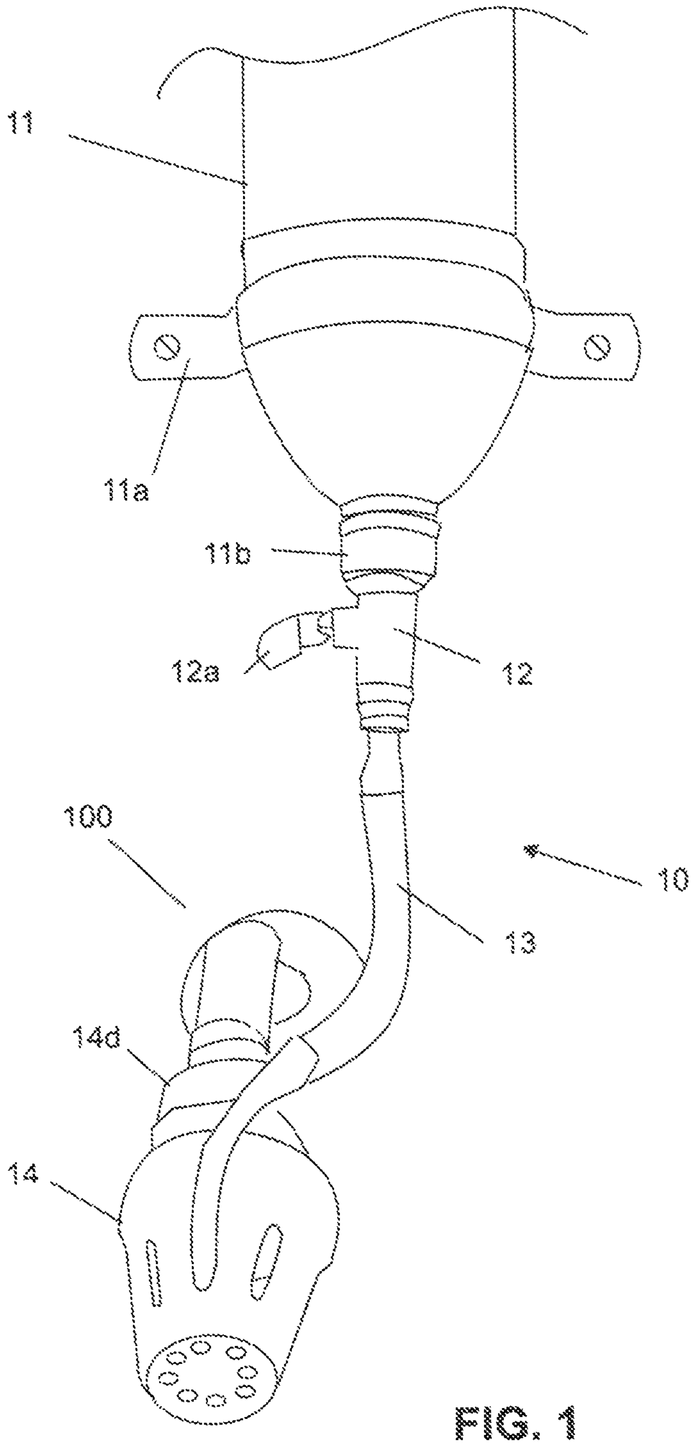
FIG. 1 is a front perspective view of the invention installed in a typical shower stall with a manual operating valve.

Referring now to the drawings and especially FIG. 1, a front perspective view of the invention 10 as installed in a typical shower stall is shown. The invention 10 consists of four parts. The first is a dispenser bottle 11 that is secured to a wall above the shower head piping 100 by a bracket 11*a*. The bottle 11 also has an exit port 11*b* extending downwardly from the bottle as shown. The second is a valve 12 that is used to open the dispenser bottle to allow fluid to flow from the bottle 11. The valve 12 is attached to the exit port 11*b* on the bottle. The third is a flexible hose 13. The fourth component is a diffuser cap 14. Note how the flexible hose 13 extends downward from the valve 12 and into the diffuser cap 14 as shown. The position of the hose permits the fluid, for example, liquid soap, to enter the diffuser and mix with water coming from the shower head 101 (see, FIG. 3). What comes out of the diffuser is a mixture of the liquid and water. In the case of soap, for example, the product is a foamy mixture that is readily applied to the body by a user.

Figure 1A:
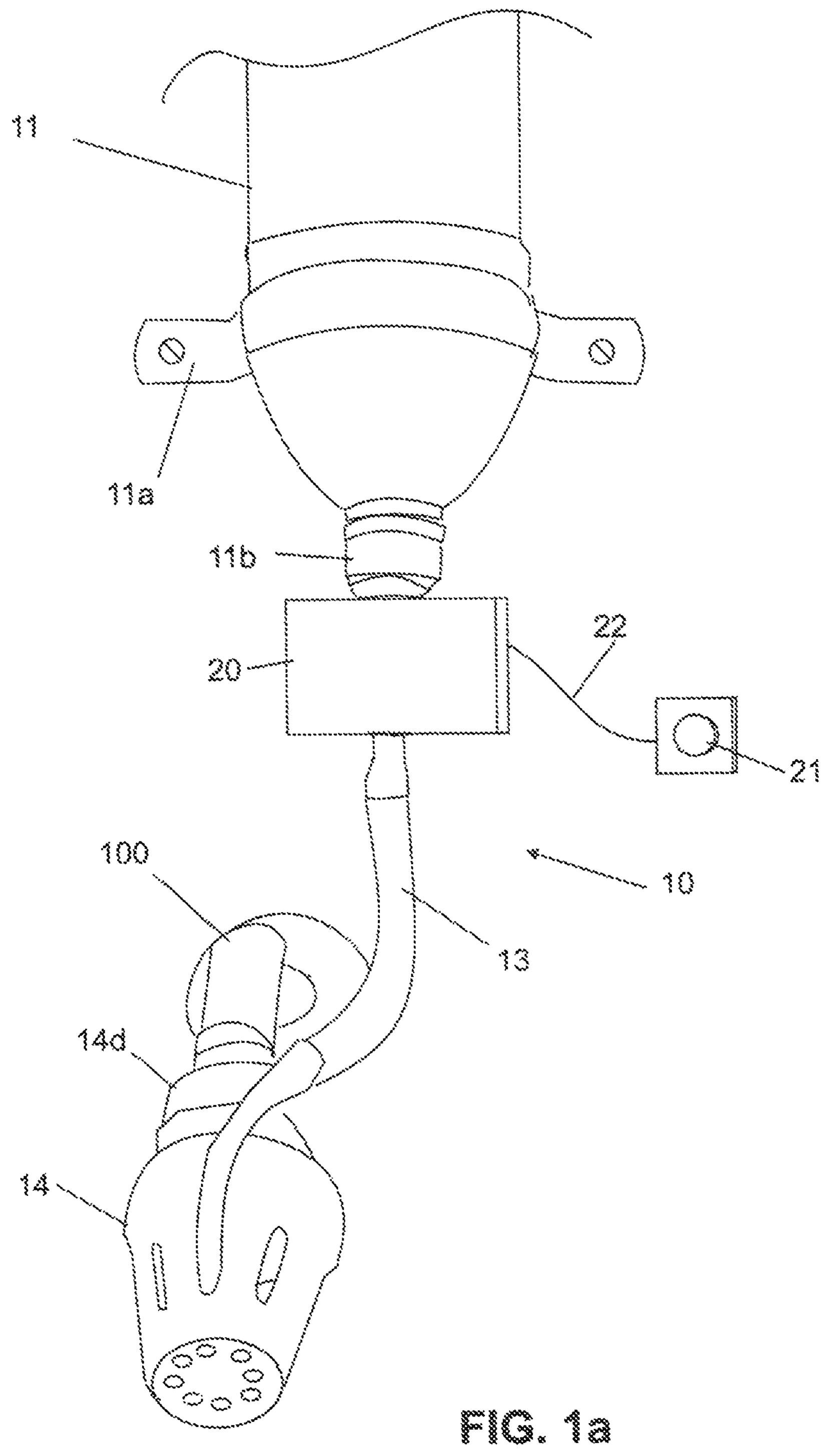
FIG. 1*a* is a front perspective view of the invention installed in a typical shower stall showing a motorized valve and control.

In FIG. 1, the valve has a manually operated handle 12*a*, which is considered to be one of the means for opening and closing the valve 12. FIG. 1*a* shows a motorized valve 20, which also constitute a means for opening and closing the valve. In the preferred embodiment, the control 21 is a push button or momentary contact switch mounted on the shower wall and is connected to the motorized valve by a wire 22. The button 21 and wire 22*b* constitute a means for operating the motorized valve.

Figure 2:
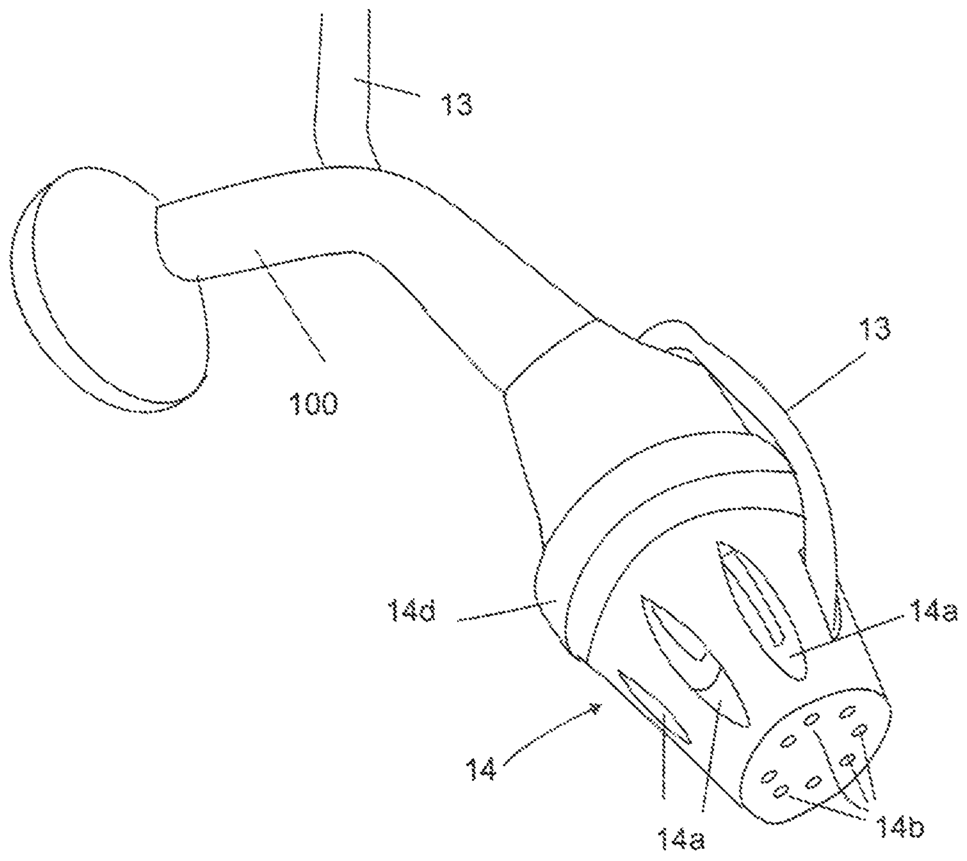
FIG. 2 is a side perspective detail view of the shower head portion of the invention.

FIG. 2 is a side perspective detail view of the shower head portion of the invention. In this view, the diffuser cap 14 is shown in position over the shower head (see FIG. 3). Note the shower head piping 100 and the flexible hose 13. As discussed below, the diffuser cap 14, a frustum of a cone, has large openings 14*a* in the side and a number of smaller openings 14*b* in the top. Note how the flexible hose 13 enters the diffuser cap 14 through one of the large openings 14*a*.

Figure 3:
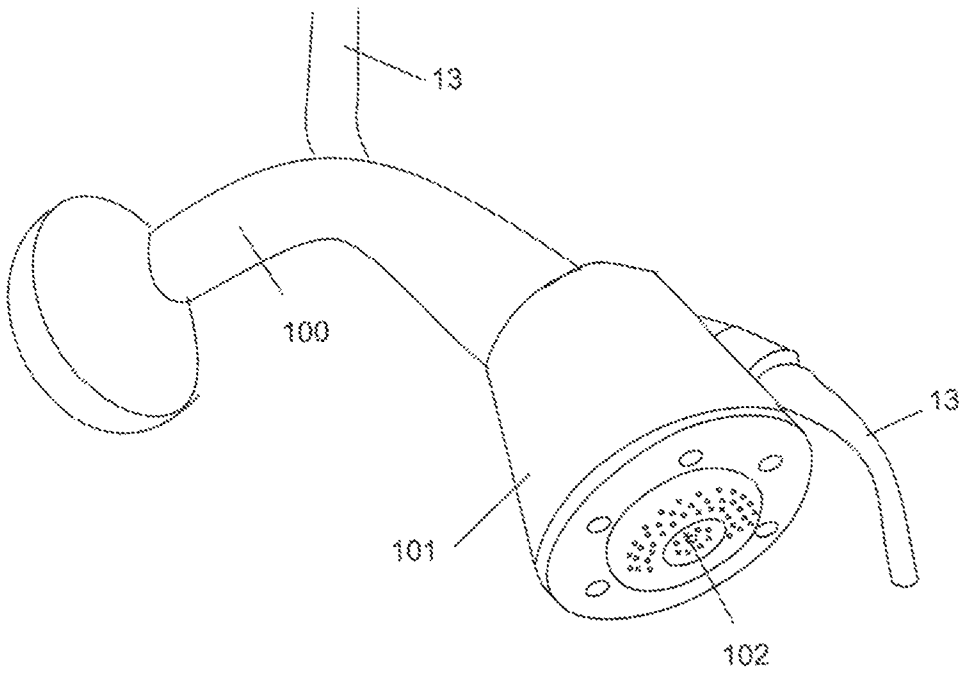
FIG. 3 is a side perspective detail view of the shower head portion of the invention with the diffuser cap removed.

FIG. 3 is a side perspective detail view of the shower head portion of the invention with the diffuser cap removed. Here, the shower head 101 is shown with the shower head piping 100. The holes 102 in the shower head that emit water. Note too, the position of the flexible hose 13. Note that this design does not require any plumbing changes to be made.

Figure 4:
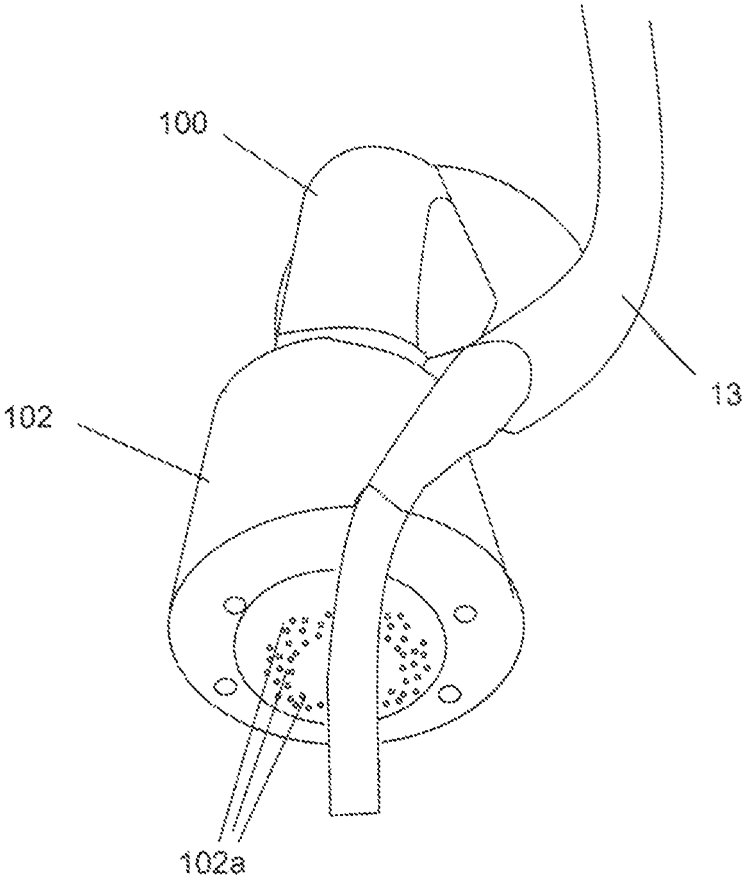
FIG. 4 is a front detail view of the shower head portion of the invention with the diffuser cap removed.

FIG. 4 is a front detail view of the shower head portion of the invention with the diffuser cap removed. Here again the shower head 101 is shown with the shower head piping 100. Note the position of the flexible hose 13 and its relation to the shower head holes 102 that enable it to deliver the liquid directly into the water flow without having to modify the piping in any way.

Figure 5:
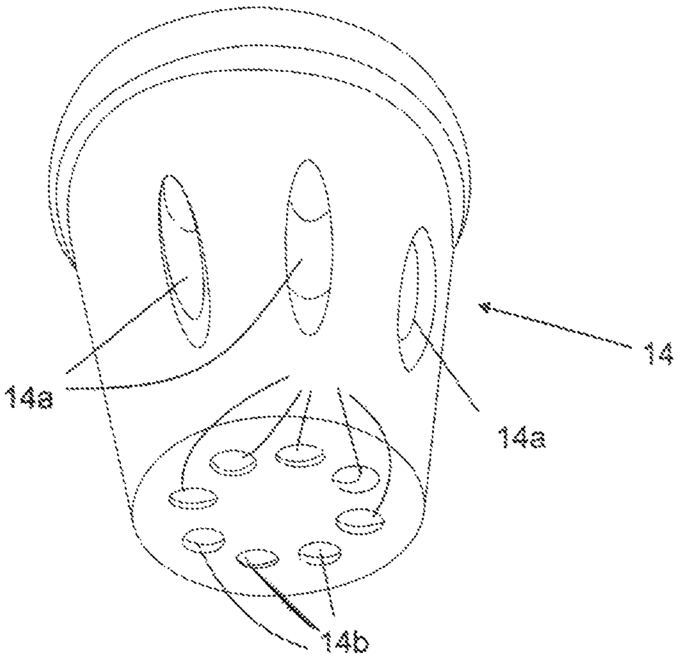
FIG. 5 is a top perspective view of the diffuser cap.

FIG. 5 is a top perspective view of the diffuser cap. The diffuser cap 14 is basically a frustum of a cone that has an open bottom. As discussed above, the diffuser cap 14 has large openings 14*a* in the side and a number of smaller openings 14*b* in the top. The water and liquid mixture can exit through the small holes 14*b* on the top, or through the larger openings 14*a* in the sides.

Figure 6:
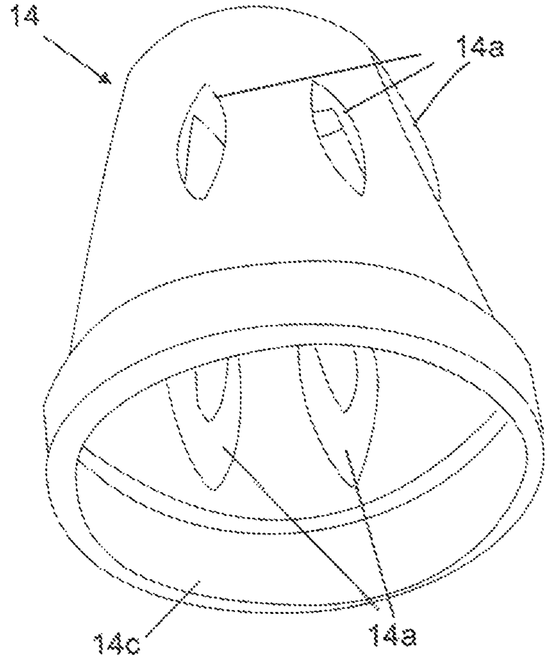
FIG. 6 is a bottom perspective view of the diffuser cap.

FIG. 6 is a bottom perspective view of the diffuser cap. This view shows that the diffuser cap 14 is a hollow structure. Note the side openings 14*a*. The bottom of the diffuser cap 14 is open and has a ring 14*c* around it, as shown. The ring 14*c* is sized to fit a standard shower head 102. Of course, the size of the diffuser cap can be adjusted as need to fit different types of shower heads. The diffuser cap 14 is held on the shower head 102 by a waterproof tape 14*d* (see FIGS. 1 and 2), or by other means such as fasteners.

The dispenser can dispense a variety of liquids such as shampoo, soap, conditioner, body wash and cleansing gel.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A system for dispensing liquids proximate to a shower head having an outer surface and a water dispensing face, comprising:

a container configured to contain a dispensable liquid, said container being removably installed remote from a water supply of said shower head;

a valve body operatively coupled to an exit port on said container;

a diffuser cap, having the shape of a frustum of a cone having an open bottom, tapered sides, a hollow interior, and a flat top, wherein a diameter of the open bottom is greater than a diameter of the flat top; said tapered sides of said diffuser cap having a first plurality of ovular holes formed therein, the open bottom of the diffuser cap configured to be disposed over the water dispensing face of said shower head, and having a second plurality of openings formed in the flat top configured to diffuse water dispensed from said water dispensing face of said shower head; and a dispensing hose having two ends, one of said two ends operatively coupled to said valve body and the other of said two ends inserted through one of said first plurality of ovular holes of said diffuser cap so as to protrude through the diffuser cap and to be disposed downstream of the water dispensing face of the shower head, between the water dispensing face and an inside surface of the flat top.

2. The system of claim 1 further comprising a means for opening and closing a valve installed in said valve body.

3. The system of claim 2 wherein the means for opening and closing the valve include a manually operated handle.

4. The system of claim 2 wherein the means for opening and closing the valve include a motor and a means for operating said motor.

5. The system of claim 4 wherein the means for operating said motor comprises a push button.

6. The system of claim 1 wherein the dispensable liquid is selected from the group consisting of shampoo, soap, conditioner, body wash and cleansing gel.

7. The system of claim 1 wherein the first plurality of ovular holes is positioned longitudinally on said tapered sides of said diffuser cap.

8. A system, comprising:

a shower head having an outer surface and a water dispensing face;

a container configured to contain a dispensable liquid, said container being removably installed remote from a water supply of said shower head;

a valve body operatively coupled to an exit port on said container;

a diffuser cap having an open bottom disposed over the water dispensing face of said shower head, the diffuser cap having the shape of a frustum of a cone, including the open bottom, tapered sides, a hollow interior, and a top, wherein a diameter of the open bottom is greater than a diameter of the top, said tapered sides of said diffuser cap having a first plurality of ovular holes formed therein, the diffuser cap having a second plurality of openings formed in the top configured to diffuse water dispensed from said water dispensing face of said shower head; and a dispensing hose having a first end operatively coupled to said valve body and a second end inserted through one of said first plurality of ovular holes of said diffuser cap so as to protrude through the diffuser cap and to be disposed downstream of the water dispensing face of the shower head, between the water dispensing face and an inside surface of the top.

* * * * *